Jan. 10, 1939.  B. G. CARLSON ET AL  2,143,139
HYDRAULIC AUTOMATIC PILOT
Filed Oct. 23, 1936  4 Sheets-Sheet 2
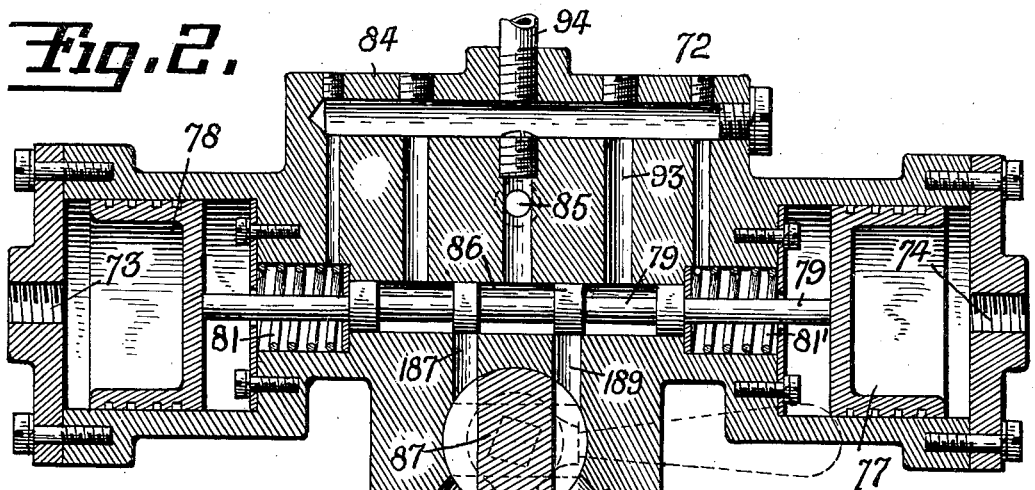
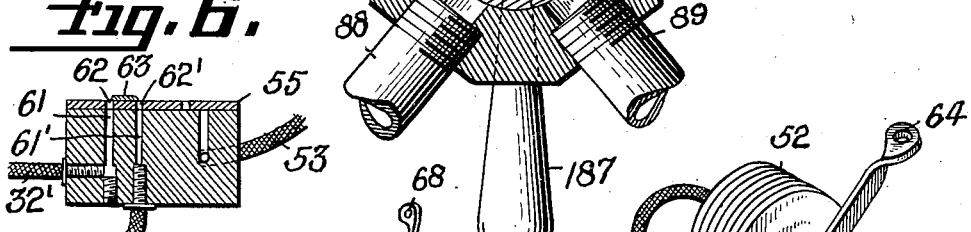
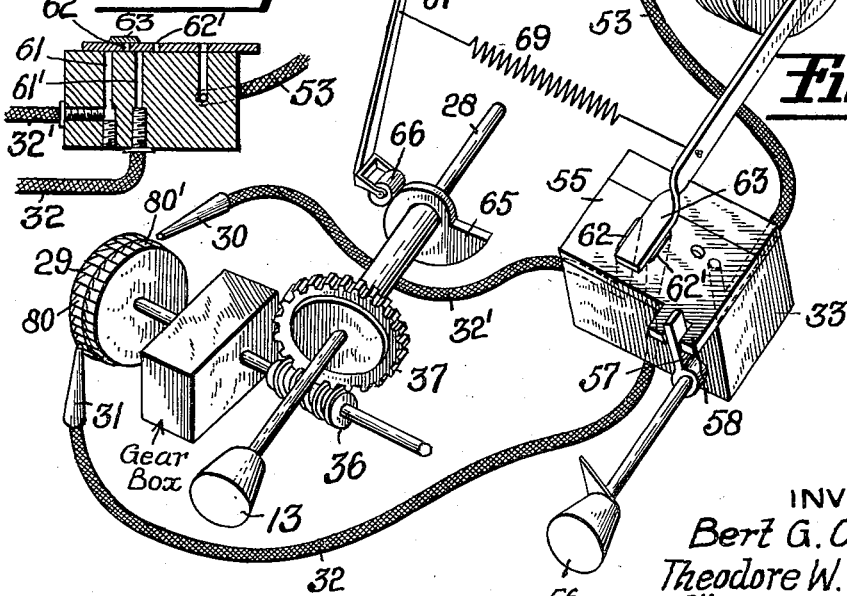
INVENTORS
Bert G. Carlson
Theodore W. Kenyon
BY
Herbert H. Thompson
THEIR ATTORNEY Jan. 10, 1939.  B. G. CARLSON ET AL  2,143,139
HYDRAULIC AUTOMATIC PILOT
Filed Oct. 23, 1936  4 Sheets-Sheet 3
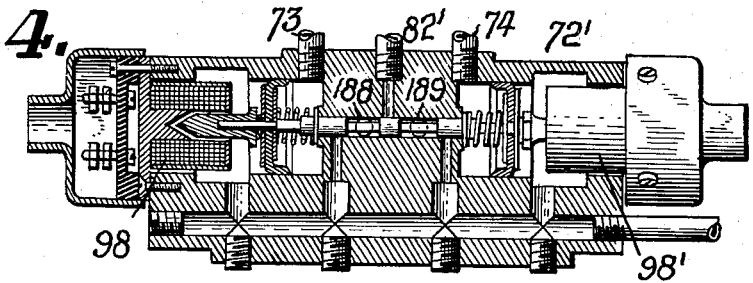
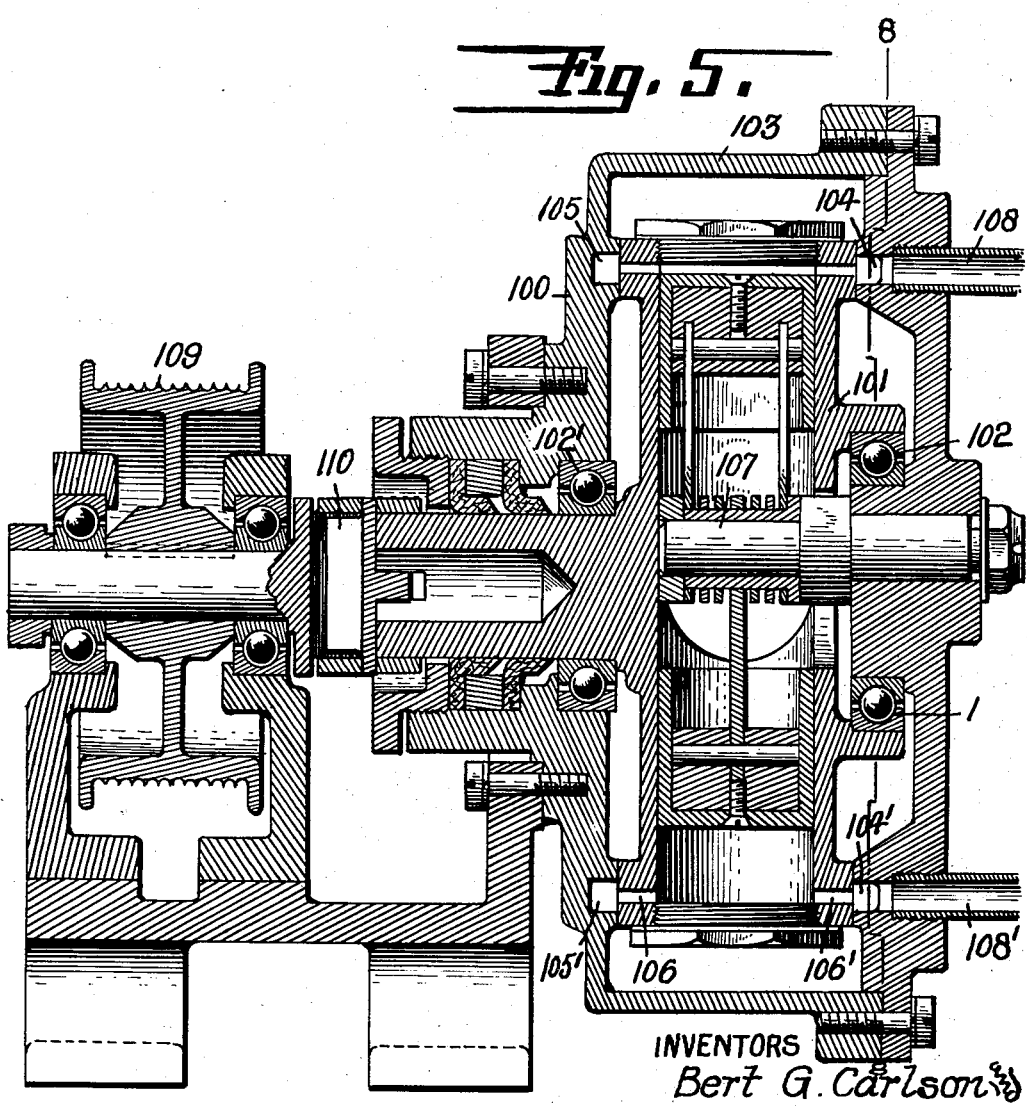
INVENTORS
Bert G. Carlson
Theodore W. Kenyon
BY
Herbert H. Thompson
THEIR ATTORNEY Jan. 10, 1939.  B. G. CARLSON ET AL  2,143,139
HYDRAULIC AUTOMATIC PILOT
Filed Oct. 23, 1936   4 Sheets-Sheet 4

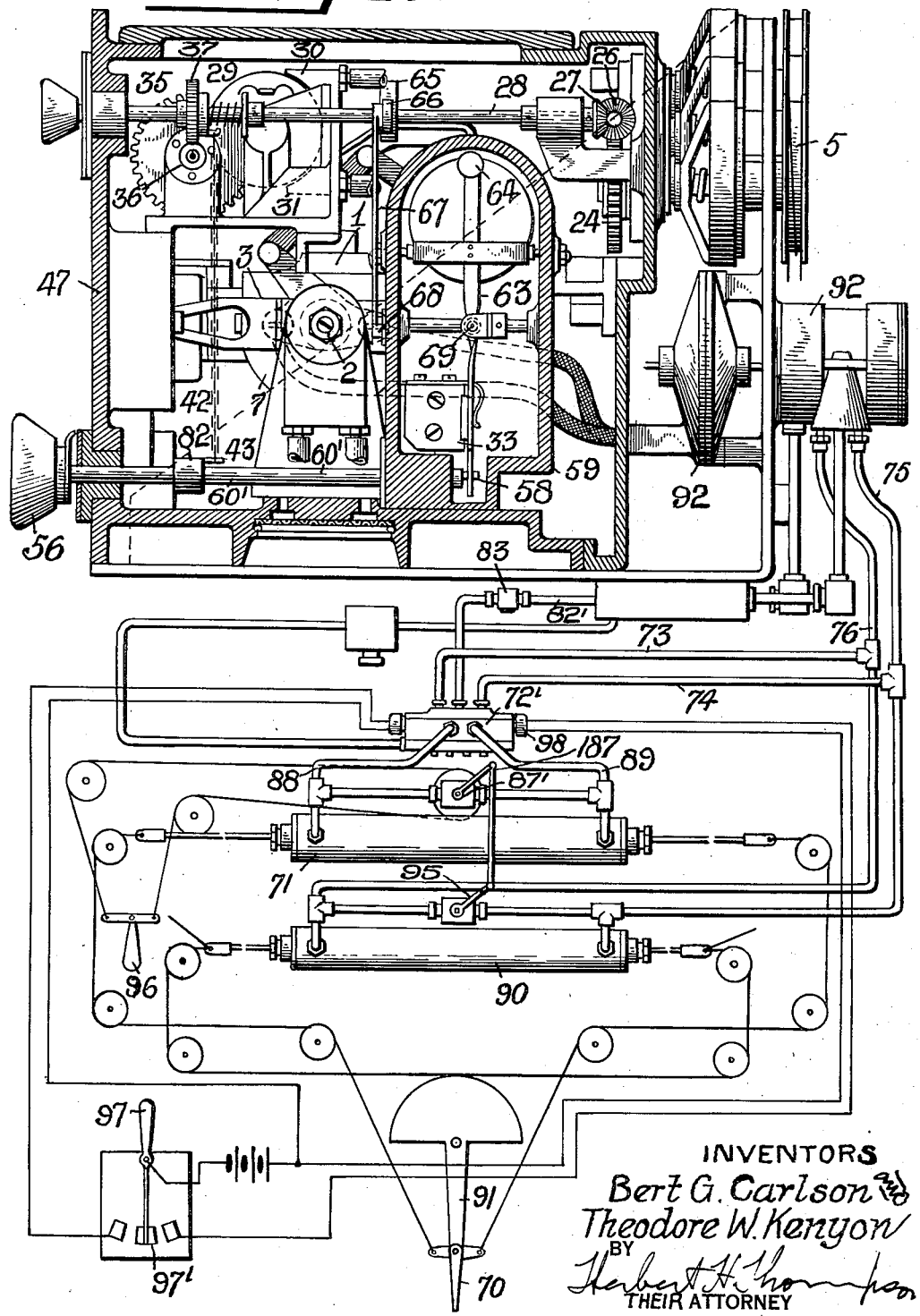

INVENTORS
Bert G. Carlson and
Theodore W. Kenyon
BY
THEIR ATTORNEY

Patented Jan. 10, 1939

2,143,139

UNITED STATES PATENT OFFICE 2,143,139

HYDRAULIC AUTOMATIC PILOT

Bert G. Carlson, Freeport, and Theodore W. Kenyon, Huntington, N. Y., assignors to Sperry Gyroscope Company, Inc., Brooklyn, N. Y., a corporation of New York Application October 23, 1936, Serial No. 107,152

15 Claims. (Cl. 244—78)

This invention relates to automatic pilots for aircraft, and, more particularly, to a barometric control for causing the craft to fly at a uniform altitude.

In prior devices, great trouble has been experienced in maintaining a uniform altitude, the airplane usually alternately ascending and descending above and below the altitude that should be maintained. In our invention we provide a simple device for maintaining uniform altitude without the hunting action of the prior devices of this character.

A further improvement consists in means to control one or more of the control surfaces of the aircraft, at will, through the servo motor system normally controlled by the automatic pilot equipment so that the servo motor system may be made use of both when flying automatically and under control of the operator. This is important in large aircraft where considerable manual effort is required to move the control surfaces directly.

A further improvement achieved by our invention is an improved form of hydraulic servo motor adapted for large movements of the rudder cables, for which the fixed pistons of the prior art are not adapted.

Further objects of the invention will become apparent from the following detailed description.

In the drawings,

Fig. 1 is a side elevation, partly in section, of the automatic control unit, showing also diagrammatically the hydraulic servo motors and control surfaces actuated therefrom.

Fig. 2 is an enlarged sectional detail of one form of auxiliary control valve for the auxiliary servo motor.

Fig. 3 is a diagrammatic view of my improved barometric control means.

Fig. 4 is a transverse section of a modified form of auxiliary control valve.

Fig. 5 is a vertical section of our preferred form of hydraulic motor for operating the controls.

Fig. 6 is a sectional detail through the pick-off control box actuated by the barometric means.

Fig. 7 is a similar view showing the parts in the shut-off position.

Figure 8:
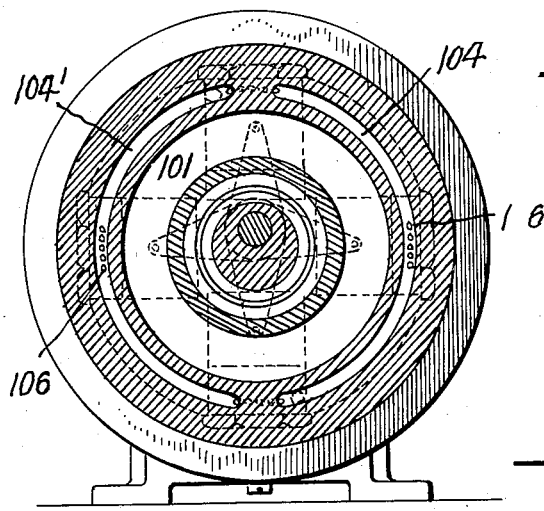
Fig. 8 is a sectional view of the hydraulic servo motor on line 8—8 of Fig. 5.

Our invention is shown as applied to an automatic pilot of the general type shown in prior Patent #1,992,970, dated March 5, 1935, to E. A. Sperry, Jr., M. F. Bates, and Bert G. Carlson, one of the joint applicants herein. In such gyro pilots, a form of gyro pendulum or base line 1 is usually used as the base line for controlling the attitude of the plane fore and aft and laterally, the gyroscope being mounted for oscillation about a transverse axis 2 within a gimbal ring 3 which, in turn, is mounted for oscillation about a fore and aft axis. The ailerons and elevators are controlled through some delicate controls about the two axes of the gyroscope, such as air pick-off devices, and the follow-up connection from the elevator is brought back to the apparatus through the follow-up pulley 5. It is the present practice to enclose the gyroscope and control parts in a closed casing 47, from which air is continuously exhausted.

The air pick-off means for elevator control may comprise a semicircular cut-off disc 7 (Fig. 9), secured to move with the gyroscope, and a pair of ports 8 and 9 pivoted on the aircraft on an axis 10 in line with the transverse axis 2 of the gyroscope. The differential pressure drop in the pipes 11 and 12 leading to said ports is used to actuate the main servo motor 90 and elevator 91 through suitable relay valve 92. Normally, the position of said ports about axis 10 is governed from the follow-up pulley 5 and also by whatever hand adjustment 13 is provided on the pilot. We prefer to also bring in the barometric control differentially through these same connections so that the changes of elevation are made through the gyroscope.

Figure 9:
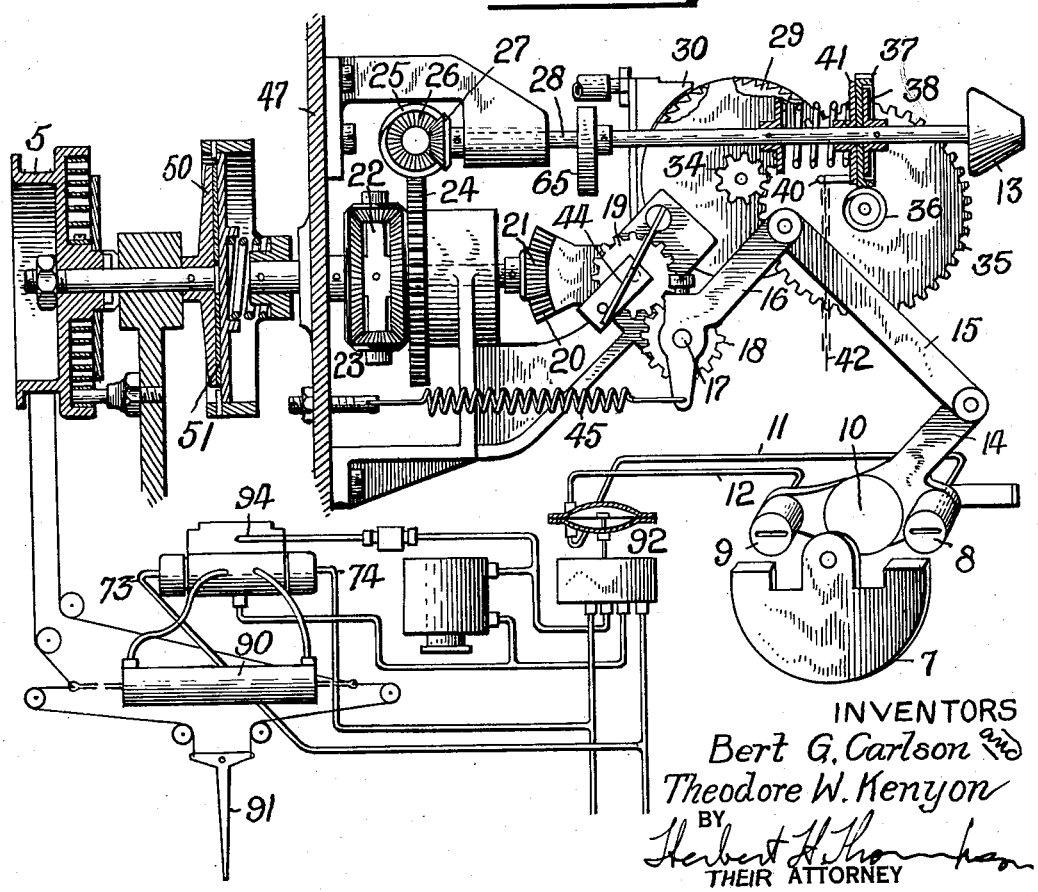
Fig. 9 is a partially exploded view of the pick-off control from the automatic pilot, showing the servo motor connected from the barometric control.

As shown in Fig. 9, the bracket 14 supporting the ports 8 and 9 is adjusted about the axis 10 by means of a link 15 from an arm 16 which is secured to the shaft 17 of pinion 18, rotated from a second pinion 19. On the shaft of the latter is a short bevel gear sector 20 rotated from a bevel gear 21, turned from planetary arm 22 of a differential 23. One side of said differential is shown as turned from the follow-up pulley 5, while the other side is shown as turned from a worm gear 24 driven from a worm 25 on the shaft of bevel pinion 26, the latter driven from a bevel pinion 27 on a long shaft 28. Said shaft may be turned directly from the thumb piece 13 to cause the craft to climb or dive, but we also preferably connect the said shaft to a small motor controlled from the barometric means. Said motor is shown as a small, light, reversible air turbine 29 driven in either direction from air nozzles 30 and 31, connected to pipes 32 and 32' leading to the barometric means 33 (see Figs. 1 and 3). Said turbine is shown as comprising a pair of oppositely facing, bladed rotors 80, 80', one for each nozzle. The turbine is connected through reduction gearing 34 and 35 to drive a worm 36 (Fig. 9), turning a small worm wheel 37 loosely mounted on the shaft 28. A friction clutch 38 is preferably provided to couple said worm gear to the shaft so that the thumb piece 13 may be turned without turning the air motor and its reduction gearing.

Said clutch also permits limiting the climbing or diving angle that may be introduced by the barometric means, so that in case of disarrangement of the turbine mechanism, the airplane will not be put into a dangerous attitude. Said limiting means may comprise a small stud 40 secured to the driven portion 41 of the clutch 38, which stud is attached by a chain 42 to a stud 43 secured to a collar 82 on a shaft 60' so as to limit the angular movement of the clutch part 41 in either direction to the desired number of degrees. This results in limiting the movement of shaft 28 from the air turbine, since the added load stops the turbine, but leaves shaft 28 free to be turned from knob 13. It should be noted that the length of the gear 20 is also limited. This not only acts as a limit means, but prevents damage to the apparatus, since the pinion merely runs off the end of the short segment when turned too far and rotates no further, being held in this position by the leaf spring 44. The spring 45 is for the purpose of taking up lost motion in the gearing.

Figure 10:
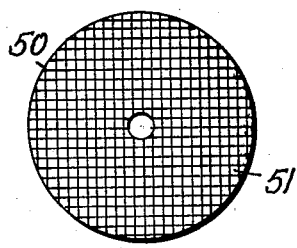
Fig. 10 is a face view of the clutch connecting the follow-up pulley with the automatic pilot mechanism.

Preferably, the follow-up pulley 5 is detachably connected to the automatic pilot mechanism as through a friction clutch 50, one face of which is serrated as shown at 51 in Fig. 10, so that the pulley and shaft may be readily disconnected from the gyro pilot.

The barometric control proper preferably consists of a flexible container 52 of the type employed in aneroid barometers, but which in this case has a pipe connection 53 which may be opened or closed to the atmosphere at will. As shown, said pipe connection connects with a port 54 in the control box 33, which may be either opened or closed to the atmosphere by the lateral movement of a slidable cover plate 55, the position of which may be controlled from a thumb piece 56. On the shaft of said thumb piece is shown a lug 57 engaging a fork 58 in the top plate.

As shown in Fig. 1, the nozzles 30, 31 which operate the servo motor 29 are mounted within the casing 47, from which air is being continuously withdrawn. The box 33, however, is preferably enclosed in a separate casing 59 which is cut off from the main casing 47 and is open at the top to the atmosphere. The box 33 is shown as having two ports 61, 61' therein, connected respectively to pipes 32 and 32', and these ports are normally in line with the small slotted openings 62, 62' in the top plate 55 so that, in operation, air is drawn in through said ports and issues from the nozzles 30, 31. As long as the pressure on both nozzles is equal, the turbine will stand still, but the differential pressure is controlled by a shutter 63 pivoted at 64, the movement of which is governed by the expansion and contraction of the barometric container 52.

In order to prevent hunting of the aircraft in elevation, we have shown a follow-back connection from the turbine 29 to the barometric means. This is preferably in the form of a cam 65 shown as mounted on shaft 28 turned from the turbine, against which bears a roller 66 on a lever 67 pivoted at 68. The lever 67 is connected by means of a spring 69 to the shutter 63 so that the tension of the spring, and thereby the loading of the flexible container 52, is varied as the turbine 29 revolves. This means has been found to be very effective in maintaining uniformly level flight, in that it causes the open port 62 or 62' to be closed somewhat prior to the time that the upper altitude is reached, thus causing the aircraft to level off.

With the plate 55 positioned as shown in Fig. 6, the barometric means is in operation, the port 55 being at that time closed so that the barometer is sealed. If it is desired to change the altitude or throw out the automatic means, the handle 46 is merely moved clockwise in Fig. 3, thus moving plate 55 to the right, shutting off the air supply to the nozzles 30, 31 and connecting the pipe 53 to the atmosphere. By this means the barometer can be designed to be sensitive to small changes of altitude, since its range may be made limited.

The automatic pilot in Fig. 1 is shown as operating one of the larger types of aircraft in which both a trim rudder or auxiliary control surface 70 and service rudder or elevator 91 are employed. According to this system, a main servo motor 90 actuated directly from the relay 92 is employed for operating the service rudder 91, while an auxiliary servo motor 71 is employed for operating the trim rudder 70 somewhat in accordance with the principles outlined in the prior patent of Bert G. Carlson, one of the joint applicants, #2,045,579, dated June 30, 1936. According to this system, the auxiliary servo motor 71 is controlled by preponderating pressures in the main servo motor 90, but we have improved upon the prior system by increasing the sensitivity of the control of motor 71. This may be effected by employing a relay valve mechanism 72 (see Figs. 2 and 4) between the supply lines 75 and 76 and motor 71.

Since Fig. 2 is drawn to a larger scale, this form of relay valve will be first described. Said valve is shown as coupled through pipe couplings 73, 74 to the pipes 75, 76 which connect the relay 72 to the main servo motor 90. The differential pressure in said two pipes causes movement of the pistons 77 and 78 which are connected through the common valve rod 79 and which are normally centralized by opposed compression springs 81, 81'. Oil at pump pressure is supplied to said valve through a pipe 82', but a needle valve 83 is interposed in said pipe so that the flow therethrough is greatly restricted. Said pipe is shown as entering the valve block 84 through port 85. The entering oil passes downwardly, then laterally within the bore 86 housing the valve rod 79, so that when said rod is moved to the left, for instance, oil passes downwardly through port 187 and through the by-pass valve 87 and into pipe 88 leading to one side of the cylinder 71. At the same time the other side of said cylinder is connected through the pipe 89 to the return side of the pump through port 188, channel 93 and pipe 94. It will be obvious that the reverse action takes place when the slide valve 79 is moved in the opposite direction.

The operation of this relay valve is as follows. The airplane is normally flown through the operation of the main servo motor 90 and main control surface or elevator 91. In case, however, there is continued pressure on one side of the control surface, so that a greater average pressure is maintained on one side of the piston in cylinder 90 than the other, the relay valve 79 will be displaced, causing oil to be admitted slowly into the cylinder 71. This oil, although at pump pressure, is throttled down through the needle valve 83, so that the piston in cylinder 71 will not be moved unless the flow of oil is maintained for an appreciable time in one direction. In this event, the piston in cylinder 71 will be actuated to move the auxiliary control surface 70 to change the trim of the craft and to relieve the tension on the main cables from the cylinder 90.

The relay shown in Fig. 4 operates similarly in principle, the parts being correspondingly marked, with primed numerals where different, although in this case the parts are arranged somewhat differently and the by-pass valve is not shown, being separated therefrom as shown in Fig. 1. Preferably the crank handles 187' by-pass valve 87' for the cylinder 71 and 95 for the cylinder 90 are cross connected so that one valve throws the other, and a common handle 96 may be provided for throwing both together. Said handle may be located adjacent the pilot's seat and there may also be provided at that point auxiliary control handle 97 by which the pilot may operate the control surfaces with little manual effort through the same servo motors normally used in the automatic pilot. A simple method for effecting this result is by placing an electric switch 97', operated from the handle 97, in circuit with solenoids 98, 98' secured to the relay valve 72' (Fig. 4). When one or the other of said solenoids is excited, the valve rod is displaced and the piston in cylinder 71 operated.

Where long cable movement is required for movement of the control surfaces, the single cylinder and piston form of servo motor becomes cumbersome and undesirable. Figs. 5 and 8 illustrate a form of hydraulic servo motor designed for such use. According to this form of the invention, the hydraulic servo unit is in the form of a multi-cylinder rotary engine 100, the cylinder block 101 being rotatably mounted in anti-friction bearings 102, 102' within the stationary housing 103. Said housing has a pair of annular ports 104, 104' and 105, 105' on each side of the interior thereof and the tops of the cylinder blocks each have a plurality of small ports 106, 106' bored therethrough on both sides. The diametrically opposite pistons are placed 180° apart and the piston rods all engage the common stationary crank shaft 107. Oil under pressure is fed through one of pipes 108 or 108' into one of the port chambers 106, 106', while the other pipe returns the oil to the sump. It will readily be apparent, therefore, that as each cylinder passes the intake port it will be forced outwardly under the oil pressure, and as it passes the outlet side the oil will be ejected therefrom. The engine is shown as coupled to a drive pulley 109 through universal coupling 110, the usual control wires being connected to said pulley. With our improved construction, the abutting walls of the revolving cylinders and the housing adjacent the annular ports 104 and 105 are effectively lubricated by the oil under pressure passing into and out of the engine, which pressure is maintained equal on both sides of the cylinder block.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an elevation control for aircraft automatic pilots, the combination with servo means for operating the elevator, of a barometric device, an auxiliary servo motor, a control device operated from said barometric device for controlling said auxiliary servo means, a controller for said first named servo means operated in part by said auxiliary servo means and follow-back means connecting said device and said auxiliary servo means for maintaining level flight.

2. In an elevation control for aircraft automatic pilots, the combination with servo means for operating the elevator, of a spring loaded barometric device for controling said means, and means operated by movements of the elevator for varying the spring loading of said device.

3. In a control device for aircraft, the combination with an artificial horizon for controlling the elevator, of a flexible container closed to the atmosphere at will, a shutter connected to the movable side of said container so as to be moved as said container expands and contracts, an air port on each side of said shutter but out of contact therewith, a pair of oppositely acting air motors, one connected to each port, both motors being under the same negative pressure, whereby said motor is differentially driven in accordance with the coverage of said ports, controls at the horizon, the relative position of which is altered by said motors, and a common means for rendering said motors inoperative and for opening said container to the atmosphere.

4. In an automatic pilot for aircraft, dual means for maintaining level flight comprising a gyro-vertical and an expansible, normally spring centralized container normally open to the atmosphere, means for closing the same at will, means brought into action by expansion or contraction of said container after closing, due to ascent or descent of the craft, for altering the relation between the gyro-vertical and craft to maintain level flight, and follow-back means for altering the centralized position of said container with the operation of said last named means.

5. In a control device for aircraft, the combination with an artificial horizon for controlling the elevator, of a spring loaded flexible container of the aneroid barometer type, a shutter connected to the movable side of said container so as to be moved as said container expands and contracts, an air port on each side of said shutter but out of contact therewith, a pair of opposed air nozzles, one connected to each port, means for subjecting both nozzles to the same negative pressure, means operated by said nozzles for altering the controls at the horizon from which the position of the elevator is controlled, and means operated by said last named means for varying the spring loading on said shutter for the purpose specified.

6. In an automatic pilot for aircraft, the combination with a service rudder and a hydraulic servo motor for operating the same, of an auxiliary rudder and an auxiliary hydraulic servo motor for operating said auxiliary rudder, including a relay valve connected to the supply pipes to said first named motor so as to be moved by the preponderating pressure in said pipes, and adapted to supply oil at substantially pump pressure, but through a needle valve, to cause said second motor to slowly respond to continued preponderance of pressure in the supply pipes to the first motor.

7. In an automatic pilot for aircraft having a service and an auxiliary control surface, a source of fluid pressure, a fluid operated servo motor controlled from said pilot for actuating one of said surfaces, a second servo motor for actuating the other control surface, a relay valve connected across the supply lines to said first motor, and between said supply source and said second motor, and means for retarding the flow of fluid thereto from said supply.

8. In an automatic pilot for aircraft having a service and an auxiliary control surface, a source of fluid pressure, a fluid operated servo motor controlled from said pilot for actuating one of said surfaces, a second servo motor for actuating the other control surface, a relay valve, for operating said second motor subject to prolonged unbalanced pressure on said first motor, and means operable at will for actuating said valve independently of the automatic pilot.

9. In a hydraulic motor for the control surfaces of aircraft and the like, a casing, a multi-cylinder engine rotatably mounted within said casing, each cylinder having a port transversely through the head thereof and adapted to register with substantially semicircular intake and outlet ports on the interior of said casing, and a common stationary eccentric crank shaft to which the pistons of said cylinders are connected.

10. In an auxiliary hydraulic pilot for aircraft, the combination with a service rudder and means for operating the same, of an auxiliary rudder and a hydraulic servo motor for operating said auxiliary rudder, including a hydraulic valve adapted to supply oil under pressure to said motor, said valve being responsive to unbalanced pressures on said service rudder.

11. A hydraulic servo motor system for aircraft, as claimed in claim 10, having an automatic pilot controlling the service rudder and electromagnetic means for operating said auxiliary motor independently of said automatic pilot.

12. In a hydraulic motor for the control surfaces of aircraft and the like, a casing, a multi-cylinder engine rotatably mounted within said casing, each cylinder having a port transversely through the head thereof and adapted to register with substantially semicircular intake and outlet ports on each side of the interior of said casing, and a common stationary eccentric crank shaft to which the pistons of said cylinders are connected.

13. In an elevation control for aircraft automatic pilots, the combination with servo means for operating the elevator, of a barometric device, an auxiliary servo motor, a control device operated therefrom for controlling said auxiliary servo means, a controller for said first named servo means operated in part by said auxiliary servo means, and means associated with said device for causing said device to stop said auxiliary servo means prior to reaching the predetermined altitude, whereby hunting is prevented.

14. In an automatic pilot for aircraft, dual means for maintaining level flight comprising a gyro-vertical and an expansible, normally spring centralized container of the aneroid barometer type, means brought into action by expansion or contraction of said container, due to ascent or descent of the craft, for altering the relation between the gyro-vertical and craft to maintain level flight, and follow-back means for altering the centralized position of said container with the operation of said last named means.

15. In a hydraulic servo motor system for aircraft having both service and trim control rudders, a hydraulic servo motor for operating the service rudder, an auxiliary hydraulic servo motor for operating the auxiliary rudder, and a relay valve connected to the supply pipes to said first named motor so as to be moved by the preponderating pressure in said pipes, and adapted to supply oil at substantially pump pressure, but through a needle valve, to cause said second motor to slowly respond to continued preponderance of pressure in the supply pipes to the first motor.

BERT G. CARLSON.
THEODORE W. KENYON.